United States Patent [19]
Eckersley

[11] Patent Number: 5,198,711
[45] Date of Patent: Mar. 30, 1993

[54] ELECTRIC MOTOR FOR PROVIDING LIFTING FORCE

[75] Inventor: Gregory P. Eckersley, Kew, Australia

[73] Assignee: Boral Johns Perry Industries Pty. Ltd., Cheltenham, Australia

[21] Appl. No.: 700,138

[22] PCT Filed: Sep. 6, 1989

[86] PCT No.: PCT/AU89/00374

§ 371 Date: May 24, 1991

§ 102(e) Date: May 24, 1991

[87] PCT Pub. No.: WO90/07219

PCT Pub. Date: Jun. 28, 1990

[30] Foreign Application Priority Data

Dec. 19, 1988 [AU] Australia ............... PJ2019

[51] Int. Cl.[5] .................. H02K 41/02; H02K 37/04; H02K 1/17
[52] U.S. Cl. .................. 310/12; 310/49 R; 310/181
[58] Field of Search ............ 310/12, 49 R, 112, 154, 310/181, 216, 266, 267

[56] References Cited

U.S. PATENT DOCUMENTS

| | | | |
|---|---|---|---|
| 3,706,922 | 12/1972 | Inagaki | 310/12 |
| 3,750,151 | 7/1973 | Dill | 310/49 R |
| 3,757,147 | 9/1973 | Lyman, Jr. | 310/49 R |
| 3,809,990 | 5/1974 | Kuo et al. | 310/49 R |
| 3,864,588 | 2/1975 | Inaba | 310/49 R |
| 4,528,483 | 7/1985 | Müller | 310/112 |
| 4,661,735 | 4/1987 | Miki et al. | 310/112 |
| 4,703,242 | 10/1987 | Ettelman et al. | 310/49 R |
| 4,707,642 | 11/1987 | Sorimachi et al. | 310/12 |
| 4,714,849 | 12/1987 | Yamamoto et al. | 310/12 |
| 4,803,387 | 2/1989 | Seider | 310/12 |
| 4,857,786 | 8/1989 | Nihei et al. | 310/49 R |
| 4,922,145 | 5/1990 | Shtipelman | 310/49 R |
| 4,972,108 | 11/1990 | Venturini | 310/12 |

FOREIGN PATENT DOCUMENTS

| | | | |
|---|---|---|---|
| 0096390 | 12/1983 | European Pat. Off. | 310/49 R |
| 2209084 | 9/1972 | Fed. Rep. of Germany | 310/49 R |
| 3121547 | 2/1983 | Fed. Rep. of Germany | 310/49 R |
| 2580440 | 10/1986 | France | 310/49 R |
| 52-5415 | 1/1977 | Japan . | |
| 1387128 | 4/1988 | U.S.S.R. . | |
| 1410215 | 7/1988 | U.S.S.R. . | |
| 1422319 | 9/1988 | U.S.S.R. . | |

OTHER PUBLICATIONS

Eastham et al., Linear Induction Motor as Electromagnetic Rivers, Proc. IEE, 121, (10), pp. 1099–1108.
Laithwaite et al., Linear-Motion Electrical Machines, IEEE, vol. 58, Apr. 1970, pp. 531–542.

Primary Examiner—Steven L. Stephan
Assistant Examiner—C. La Balle

[57] ABSTRACT

An electrical motor has a ring with a plurality of stepped portions in at least one surface. There are plurality of C-shaped cores spaced along the ring, the C-shaped cores each having at least one surface provided with stepped portions which oppose the surface of the first member having the stepped portions. Each of the C-shaped cores has a permanent magnet and a ring providing a flux path joining the magnets.

11 Claims, 1 Drawing Sheet

ELECTRIC MOTOR FOR PROVIDING LIFTING FORCE

This invention relates to a motor and, in particular, to a motor for raising and lowering lift cars in a lift well.

The invention may be said to reside in a motor comprising a first member having a plurality of stepped portions in at least one surface, a plurality of second members spaced along said first member, said second members each having at least one surface provided with stepped portions which oppose the surface of the first member having the stepped portions, each of said second portions having a permanent magnet and a member providing a flux path joining said magnets.

Preferably said first member comprises a ring shaped member with stepped portions being provided on inner and outer surfaces of said ring shaped member.

Preferably said plurality of second members comprise generally C-shaped members comprised of two side members and a cross piece, with stepped portions provided on inner surfaces of the side members, an inner surface of one of the side members of each said second member being opposed to the inner side of the ring and an inner surface of the other side member of each second member being opposed to the outer side of said ring.

Preferably said permanent magnets are arranged on the surface of said cross member of said second portions remote from said first member. In other embodiments the magnet could be arranged on one of the outer surfaces of the sides of the cores.

Preferably the magnets of adjacent said second members are arranged such that their poles are opposite to one another.

Preferably the spatial or phase relationship between stepped portions on one of said second members and the stepped portions on said first member is different to the spatial or phase relationship between stepped portions on another of said second members and the stepped portions on said first member.

Most preferably a first spatial or phase relationship between stepped portions on one surface of said one second member and the stepped portions on the first member are the same as the spatial or phase relationship between the stepped portions on one surface of said another of the second members and the stepped portions on said first member and wherein a second spatial or phase relationship between stepped portions on another surface of said one second member and the stepped portions on the first member are the same as the spatial or phased relationship between stepped portions on another surface of said another of said second members and the first member and wherein the first said phase relationship is different to the second said phase relationship.

In one embodiment of the invention the flux path means which joins the permanent magnets may comprise a metallic ring, preferably formed from steel. In this embodiment of the invention a plurality of windings, each of different phase would be required in order to power the motor.

In another embodiment of the invention the flux path means could be provided with a second motor which is supported on said plurality of magnets and which is substantially identical to the said motor. In this embodiment of the invention only a single phase winding will be required for each motor.

A preferred embodiment of the invention will be described by way of example in more detail with reference to the accompanying drawings in which.

Figure 1:
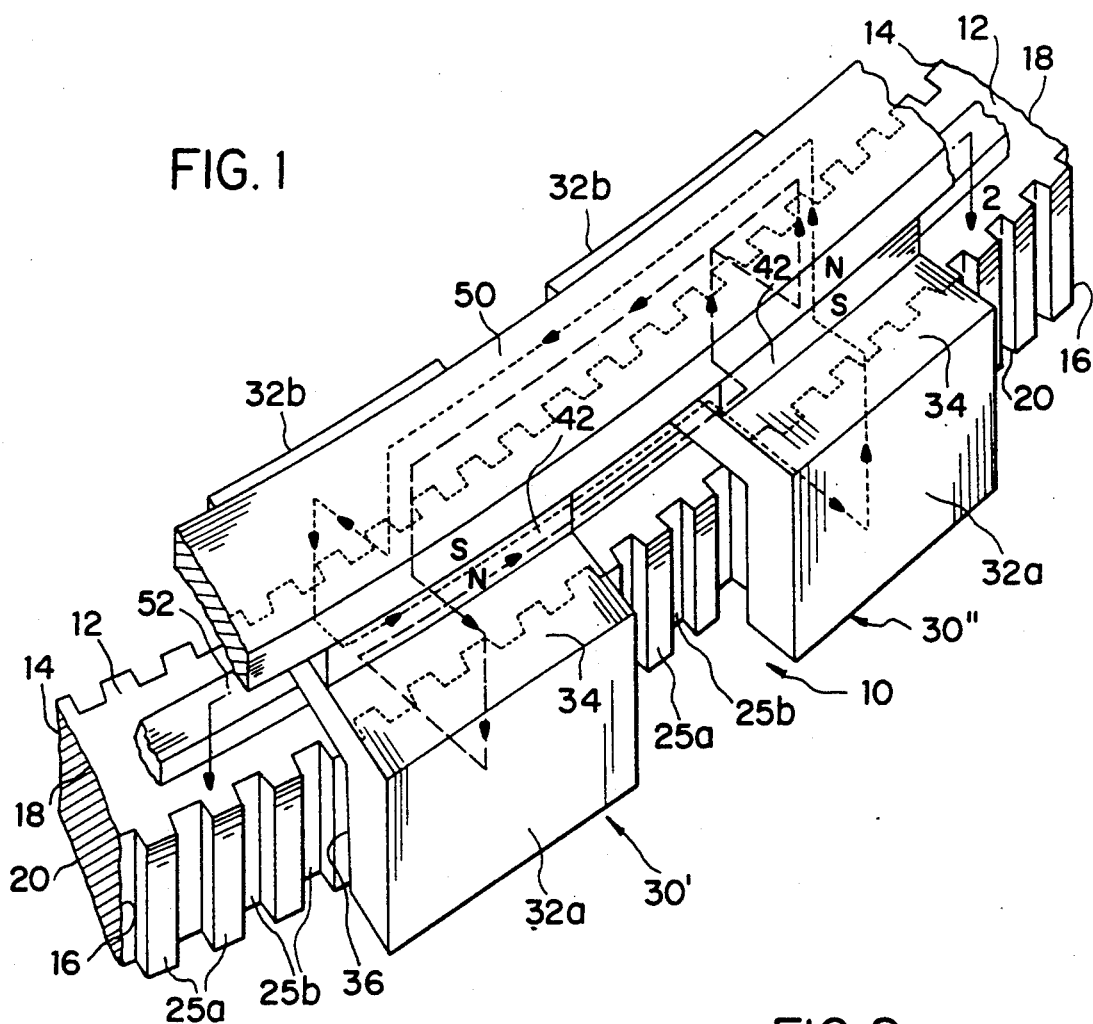
FIG. 1 is a view of part of a motor embodying the invention.

With reference to the drawings, the motor 10 comprises a first portion 12 which is preferably in the form of a ring. The ring 12 has an inner surface 14, an outer surface 16, an upper side 18 and a lower side 20. The inner and outer surfaces 14 and 16 are provided with a plurality of stepped portions 25a and 25b which are generally in the form of raised portions and grooves respectively, thereby creating arrays of teeth on the surfaces 14 and 16. Preferably the ring 12 is a laminated ring and the stepped portions 25a and 25b formed in each lamination. The laminations could be separate metal rings or formed by a helix or spiral metal strip. A plurality of second portions 30 (two of which are labelled 30', 30" in the drawings) which are generally C-shaped cores are provided about the ring 12. The C-shaped cores 30 have sides 32a and 32b and cross members 34 which join the sides 32a and 32b. The inner surfaces 36 of the sides 32a and 32b are provided with stepped segments 40a and 40b which are of the same pitch as the stepped segments 25a and 25b on the inner and outer surfaces 14 and 16 of the ring 12. The C-shaped members are formed from C-shaped laminations. The stepped segments 40a and 40b are provided by providing laminations having different spaces between their inner surfaces 36.

Each of the cross members 34 is provided with a permanent magnet 42. The permanent magnets 42 of adjacent cross members are arranged such that their poles are facing in opposite directions as is shown in FIG. 1.

A flux path joining member 50 is arranged on the magnets and in one embodiment of the invention is preferably in the form of a ring of steel. In another embodiment the steel ring 50 could be replaced by a motor which is generally identical to the motor shown in FIG. 1. That is, it would have a plurality of C-shaped second members 30 which are arranged in mirror image to the C-shaped members 30 shown in FIG. 1 which rest on the magnets 42 with a further first ring 12 arranged as a mirror image to the ring 12 shown in FIG. 1.

In the embodiment shown in FIG. 1 wherein a ring 50 is utilized, a plurality of windings 52 (only one shown in FIG. 1) all of different phases are provided. The C-shaped members 30 and the stepped segments 40a and 40b are arranged such that the portions 40a and 40b of side 32a of C-shaped core 30' and the portions 40a and 40b of the side 32b of core 30" have the same spatial relationship or phase with respect to the opposed segments 25a and 25b of ring 12. The portions 40a and 40b of side 32b or core 30' and the segment 40a and 40b of side 32a of core 30" have the same spatial or phase relationship with respect to the opposed segments 25a and 25b but which is different to or out of phase with the previously mentioned spatial or phase relationship.

If the second embodiment of the invention is utilized wherein a second motor is provided as a mirror image to the first motor then only a single winding providing a single phase need be provided in each motor. The cores 30 of each motor would be so arranged to provide a different spatial or phase relationship between the portions 40a,40b and 25a,25b of one motor and the portions 40a,40b and 25a,25b of the other motor.

Figure 2:
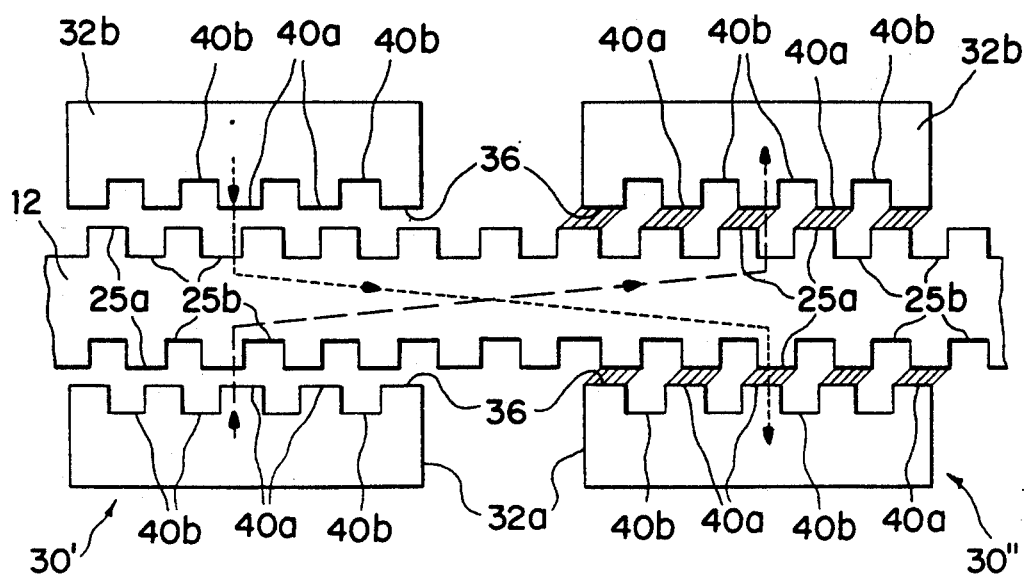
FIG. 2 is a view along the line 2—2 of FIG. 1.

The flux created by the magnets 42 and the stepped segments 25 and 40 is shown in FIG. 2 and generally acts to attract the ring 12 relative to the C-shaped cores 30. Thus, if the C-shaped cores 30 are fixed relative to the ring 12 and the ring 12 is arranged for rotation within the C-shaped cores the magnetic flux will cause the C-shaped ring to rotate relative to the C-shaped cores 32 and attempt to arrange the segments 40a to be directly opposite the segments 25a.

The flux path generated by the permanent magnets 42 together with the winding or windings 52 is shown in FIGS. 1 and 2 in dashed lines and initially passes along the flux ring 50 down through the permanent magnet 42 associated with core 30' across the cross member 34 and down the side 32 across the space between the segments 25a of the inner surface 36 of that side 32a to the segments 40a of the outer surface of the ring 12. The flux then continues through the ring 12 to the segments 40a of the inner surface of the ring 12 across the space between those segments and the segments 25a of the side 32b of the adjacent C-shaped members 30, up that wall 32b and back through the magnet 42 to the flux ring 50 thereby completing the flux path. As previously discussed the out of phase relationship between the segments 25a and 40a causes the segment 12 to move relative to the C-shaped members 30 until the segments 25a and 40a are aligned. As explained above segments on one wall of the C-shaped member of the ring 12 are of different phase with respect to the segments on the other wall of the C-shaped members and the ring 12. Thereby when the ring 12 has moved such that the segments forming the flux path referred to above are aligned with one another the segments on the other surfaces of the C-shaped members are not aligned or of different phase with respect to the segments on the ring 12 thereby creating a similar type of attraction to continue movement of the ring 12. Indeed, the movement of the ring 12 will create a second flux path which is shown by the line formed of dots shown in FIG. 1. That flux path passes along the ring 50, down through the magnet 42 associated with C-shaped member 30', across to the side wall 32b, down the side wall, across the space between the segments 40a and 25a, into the ring 12, along the ring 12 to the adjacent C-shaped members 30" (only one of which is shown), across the space between the segments 40a and 25a into the wall 32a of the C-shaped member 30", up the wall 32a and across the cross piece 34, into the magnet 34 and then up into the flux path ring 50 thereby completing the flux path. The two flux paths which are generally formed by the out of phase arrangements of the segments 50 keep the ring 12 rotating relative to the segments 30 thereby providing the motor drive.

In the embodiment of the invention shown in FIG. 1, a plurality of windings each of different phase would be utilized in order to provide the motor current and to create the flux paths referred to above to maintain the motor rotating.

In the second embodiment where a mirror image motor is provided in place of the steel flux path ring 50, this motor could be provided with a single phase winding with arrangement between the segments 25 and 40 of each motor being out of phase with respect to one another and with the rings 12 of each motor being joined together to ensure that the out of phase relationship of the segments keeps the rings 12 rotating relative to the segments 30.

The use of permanent magnets 42 is important to the preferred embodiment of the invention since if a power failure results the permanent magnets will tend to create at a breaking force on the motor to prevent the motor from rotating freely, thereby supporting the lift car in the lift well. The arrangement of the preferred embodiment also enables discrete permanent magnets to be used and for a reasonable number of magnets to be provided thereby ensuring that the motor is not unduly expensive.

Since modification within the spirit and scope of the invention may readily be effected by persons skilled within the art, it is to be understood that this invention is not limited to the particular embodiment described by way of example hereinabove.

I claim:
1. A motor comprising:
   an elongated first member having a plurality of stepped portions in at least one surface;
   a plurality of second members spaced along said first member, said first member being movable relative to the second members and having a migration axis in the direction of the relative movement;
   said second members each having at least one surface provided with stepped portions which oppose the surface of the first member having the stepped portions, said second members being formed from laminations wherein said laminations are arranged in a plane extending transverse to said migration axis,
   each of said second members having a permanent magnet and a flux path member providing a flux path joining said magnets; and
   at least one excitation coil extending solely along the migration axis for establishing a flux path from a portion of one of said second members located on one side of said elongated first member, through the flux path member across said elongated first members to a portion of another of said second members located on a second side of said elongated first member.
2. The motor of claim 1 wherein said first member comprises a ring shaped member with stepped portions being provided on inner and outer surfaces of said ring shaped member.
3. The motor of claim 1 or claim 2 wherein said plurality of second members comprise generally C-shaped members comprised of two side members and a cross piece, with stepped portions provided on inner surfaces of the side members, an inner surface of one of the side members of each said second member being opposed to the inner side of the first member and an inner surface of the other side member of each second member being opposed to the outer side of said first member.
4. The motor of claim 3 wherein said permanent magnets are arranged on the surface of said cross member of said second members remote from said first member.
5. The motor of claim 1 wherein the magnets are arranged on one of the outer surfaces of the sides of the second members.
6. The motor of claim 1 wherein the magnets of adjacent said second members are arranged such that their poles are opposite to one another.
7. The motor of claim 1 wherein the spatial or phase relationship between stepped portions on one of said second members and the stepped portions on said first member is different to the spatial or phase relationship between stepped portions on another of said second members and the stepped portions on said first member.

8. The motor of claim 1 wherein a first spatial or phase relationship between stepped portions on one surface of said one second member and the stepped portions on the first member are the same as the spatial or phase relationship between the stepped portions on one surface of said another of the second members and the stepped portions on said first member and wherein a second spatial or phase relationship between stepped portions on another surface of said one second member and the stepped portions on the first member are the same as the spatial or phased relationship between stepped portions on another surface of said another of said second members and the first member and wherein the first said phase relationship is different to the second said phase relationship.

9. The motor of claim 1 wherein the flux path member which joins the permanent magnets comprises a metallic ring.

10. The motor of claim 1 wherein the flux path member is a second motor which is supported on said plurality of magnets and which is substantially identical to the said motor.

11. The motor of claim 1, wherein there are a plurality of excitation coils each excitation coil being of a different phase.

* * * * *